United States Patent [19]

Marten et al.

[11] Patent Number: 5,847,027
[45] Date of Patent: Dec. 8, 1998

[54] HARDENERS FOR ELASTIC EPOXY RESIN SYSTEMS

[75] Inventors: Manfred Marten, Mainz; Claus Godau, Kiedrich; Uwe Neumann, Bad Schwalbach, all of Germany

[73] Assignee: Vianova Resins GmbH, Germany

[21] Appl. No.: 625,193

[22] Filed: Apr. 1, 1996

[30] Foreign Application Priority Data

Apr. 1, 1995 [DE] Germany .................. 195 12 316.6

[51] Int. Cl.⁶ .................. C08K 3/20; C08L 63/02
[52] U.S. Cl. .................. 523/404; 528/96; 528/116; 528/123; 528/270
[58] Field of Search .................. 523/404; 528/96, 528/103, 116, 123, 370

[56] References Cited

U.S. PATENT DOCUMENTS

| | | | |
|---|---|---|---|
| 3,609,121 | 9/1971 | Lohse | 260/47 |
| 4,122,069 | 10/1978 | Meyery | 528/93 |
| 4,316,003 | 2/1982 | Dante et al. | 528/111 |
| 4,484,994 | 11/1984 | Jacobs, III et al. | 204/181 |
| 4,835,289 | 5/1989 | Brindopke et al. | 549/229 |
| 4,886,845 | 12/1989 | Becker et al. | 523/403 |
| 4,892,954 | 1/1990 | Brindopke et al. | 549/229 |
| 5,032,629 | 7/1991 | Hansen et al. | 523/414 |
| 5,235,007 | 8/1993 | Alexander et al. | 525/523 |
| 5,319,004 | 6/1994 | Marten et al. | 523/404 |

FOREIGN PATENT DOCUMENTS

| | | |
|---|---|---|
| 2 049 824 | 2/1992 | Canada . |
| 2 137 748 | 6/1995 | Canada . |
| 2138748 | 6/1995 | Canada . |
| 2145590 | 9/1995 | Canada . |
| 0 535 794 | 4/1993 | European Pat. Off. . |

OTHER PUBLICATIONS

Rokicki et al., "Ployamines Containing B–Hydroxyurethane Linkages as Curing Agents for Epoxy Resin", Die Angewandte Makromolekulare Chemie 170, pp. 211–225, (1989).

*Primary Examiner*—Jeffrey T. Smith
*Assistant Examiner*—D. Aylward
*Attorney, Agent, or Firm*—Foley & Lardner

[57] ABSTRACT

Hardeners for elastic epoxy resin systems, obtained by reaction of (A) reaction products of epoxide compounds (A1) with sterically hindered amines (A3), and/or (B) cyclic carbonates prepared from the compounds (A) and carbon dioxide, and/or (C) cyclic carbonates prepared from reaction products (C1) of epoxide compounds (C11) with polyoxyalkyleneamines (C13) and carbon dioxide, and, if desired (D) additional epoxide compounds or unreacted residues of the initial epoxides for the preparation of (A), (B) and (C), with (E) polyamines having at least two secondary amino groups, and (F) if desired, further reactants, each of the epoxide compounds (A1) and (C11) containing at least two epoxide groups, and it being possible for monoepoxides to be admixed in each case, if desired.

21 Claims, No Drawings

HARDENERS FOR ELASTIC EPOXY RESIN SYSTEMS

BACKGROUND OF THE INVENTION

1. Field of the Invention

The present invention relates to hardener compositions, specifically hardener compositions for elastic epoxy resins systems. The present invention also relates to hardener containing epoxy resin systems.

2. Description of Related Art

Epoxy resins, especially those prepared from bisphenol A and epichlorohydrin, are known base materials for the production of high-quality casting resins and coating compositions. These aromatic epoxy resins, cured using polyamines, possess not only good chemical and solvent resistance but also good adhesion to numerous substrates. Bisphenol A epoxy resins which can be processed without solvents and which have as low a viscosity as possible are particularly important, and are used for example, for the protection and renovation of concrete structures, as concrete additives (ECC field, ECC=epoxide cement concrete), for elastic adhesive systems in various fields of application, and for the coating of a wide variety of substrates. When polyamines are used, the epoxy resins can be cured at ambient temperature.

In many cases, however, the range of application for the epoxy resin/polyamine systems is limited by inadequate elasticity or flexibility in the crosslinked state, whereas to bridge cracks permanently requires coating materials with high elasticity such that they "work" over the cracks and are able, in this application, to accommodate large temperature-change stresses through a high level of extensibility.

Furthermore, in the adhesive sector there is a need for elastic epoxy resin systems which retain adequate elasticity even at temperatures below 0° C. Moreover, coatings are expected to withstand severe deformation of the substrate without fractures and cracks.

In principle, it is possible to increase the elasticity of epoxy resin systems externally, by addition of plasticizer, or internally, by reducing the cross-linking density. External elasticizing agents, however, are not reactive and are not incorporated into the thermoset network. External plasticizers which can be employed are tar, phthalates, high-boiling alcohols, ketonic resins, vinyl polymers and other products which do not react with epoxy resins and amine hardeners. This type of modification, however, is limited to specific fields of application only, since it has a range of disadvantages. For instance, these additives lead to disadvantages such as considerable disruption of the thermoset structure. These additives are also limited in their plasticizing effect at low temperatures, and show a tendency to exude in the face of temperature stress and aging.

To increase the elasticity internally, compounds are added which react with the epoxy resins or hardeners and are incorporated into the crosslinking. Specifically, the elasticizing effect is achieved by the incorporation of long-chain aliphatic or highly branched additives, for example into the hardener component. In practice, it is possible by this means to control the elasticity of the epoxy resin systems to a certain extent by the use of specific hardeners. For instance, the customary polyamines such as, for example, ethylenediamine, diethylenetriamine and triethylenetetramine can be transformed into polyamidoamines by reaction with relatively long-chain polybasic acids. These hardeners, which have long been widely used, produce a satisfactory range of properties in soft hardeners for epoxy resins, but do not meet the demands for the kind of tough and resilient epoxy resin system which is necessary for many applications.

Furthermore, these epoxy resin hardener systems should have a viscosity which is as low as possible, in order to facilitate processing. Since solvents can on environmental grounds, no longer be used in many cases due to environmental concerns, undiluted or possibly water-dilutable systems are required.

U.S. Pat. No. 4,316,003 discloses epoxide-amine adducts which are suitable as hardeners for epoxy resins, especially in water-dilutable systems, and which are obtained by reacting epoxy resins, preferably saturated epoxy resins, with primary monoamines, to give an intermediate precursor product which is subsequently reacted further with polyfunctional amines. The monoamines used are those of the formula

R—NH$_2$ in which R is an alkyl, aryl, alkaryl or alkanol radical. Suitable alkylamines are those having up to 20 carbon atoms, preferably from 4 to 18 carbon atoms. The description and the examples given do not indicate any branched alkylamines or give any corresponding indications. Cyclic amines such as cyclohexylamine, benzylamine and aromatic amines are mentioned. Preference is given to the aliphatic amines having chains of 8 to 18 carbon atoms, which are obtainable under the tradename "Armeen".

The hardeners described in Pat. No. 4,316,003 are prepared in two steps with at least two different amines. In the first step, the excess polyepoxide is reacted with the primary monoamine in the presence of solvent at from 20° to 150° C. until the decrease in the epoxide groups reaches a standstill. The reaction time is in general between 20 minutes and 1.5 hours. A typical time is from 15 to 45 minutes at from 90° to 110° C. The quantity of solvent is from 10 to 50%, based on the overall mixture. Then, in the second step, the mixture is cooled to 25°–75° C. and the polyfunctional amine is added. In this step, the epoxide reacts exothermically with the excess amine.

It is generally known that epoxide groups are unstable in the presence of tertiary nitrogen groups and show a tendency toward polymerization. This is especially the case at elevated temperatures with the amines disclosed in Pat. No. 4,316,003. In view of this tendency, the preparation process of such epoxide-amine adducts, is beset with considerable disadvantages, especially on the industrial scale. Uniform molecular mass distributions are difficult to maintain, and instances of uncontrolled gelling may readily occur. Likewise another disadvantage is the use of solvents, which are required for complete reaction in step 1 (column 7, lines 13 and 14), especially in the preparation of tough and resilient and highly elastic coating compositions which contain solvent. Patent No. 4,316,003 is aimed at water-soluble systems, which are unsuitable as elastic systems in the area of coatings for bridging cracks.

EP 0 387 418 describes hardeners for epoxy resins, which are obtained by reacting polyalkylene polyamides with di- and/or polyepoxide compounds to give a precursor and then reacting this precursor with primary or secondary amines. These hardeners particularly find application in the preparation of aqueous epoxy resin-hardener emulsions or dispersions. To achieve adequate water-solubility of the epoxy resin emulsions or dispersions, it is on the one hand necessary for sufficient polyether groups, especially polyethylene oxide groups, to be present in the hardener, while on the other hand the proportion of these groups is held as low as possible so that the cured epoxy system achieves satisfactory coating performance and chemical resistance. In Examples 9 to 11 (without acrylonitrile), the proportion of polyetheramine is below 25% (below 12% relative to the overall system), while in Examples 22 I and II it is below 20% (relative to the overall system), based in each case on the solids content. For numerous applications, especially for elastic coatings and coverings, it is necessary to incorporate a substantially higher proportion of the elasticizing polyether component, for example from 30 up to 40% based on the overall system. One consequence of this is that the coatings, in the initial phase of curing (for example up to 48 h) are still soft and have a tacky surface. This generally is undesirable since it means longer waiting times before subsequent machining or use. In addition, with such highly elastic systems, it is common for unwanted residual tack to remain.

The reaction of cyclocarbonates with amines is generally known. For example, Pat. No. 4,122,069 describes the preparation of polyoxyalkylene dicarbonates from polyoxyalkylene polyamines and alkylene carbonate, and the use thereof as an additive in epoxy resin/polyamine curing.

Patent No. 4,484,994 discloses autocrosslinking polymers which comprise hydroxyalkyl carbamate and tertiary amine groups in the molecule. The polymers are reaction products of epoxy resin and amines with secondary amino groups and hydroxyalkyl carbamate groups, obtained from polyamines and cyclic carbonates.

EP 0 535 794 discloses epoxy resins are cured with a mixture of diprimary amines and carbamates. The carbamates are reaction products of diprimary amines with cyclic carbonates.

Rokicki and Lazinski, Die Angewandte Makromolekulare Chemie 170 (1989) 211–225, describe the use of reaction products of triethylenetetraamine and cyclic carbonates as hardeners for epoxy resins. The preparation of the cyclic carbonates employed is also given. A detailed description of the synthesis of cyclocarbonates from epoxides and carbon dioxide is given in European Patent Applications EP 0 212 409 and EP 0 229 622. However, no disclosure has hitherto been given of the direct preparation of cyclocarbonates from epoxides which at the same time contain nonaromatically bonded tertiary basic nitrogen in the molecule. As already described above, epoxides are unstable in the presence of tertiary basic nitrogen. Further reactions, especially those involving temperature stress, on the epoxide group can all too easily be accompanied by unwanted side reactions (self-polymerization).

SUMMARY OF THE INVENTION

One object of the invention is to provide hardeners, and curable mixtures comprising these hardeners and based on epoxy resins, which overcomes the disadvantages of the known art described above. Another object of the present invention is to provide an adhesive and/or coating material based on the hardener containing epoxy resin. Still another object of the invention is to provide a method for producing the hardeners and/or hardener containing epoxy resins.

In accomplishing the foregoing objects, there has been provided according to the present invention a hardener composition for epoxy resins, comprising reaction products of one or more compounds of (A), (B) and (C) with compound (E) and optionally one or more compounds of (D) and (F), wherein compounds (A-F) are defined as:

(A) compounds containing at least two 1,2-epoxide groups, which are reaction products of:

(A1) compounds having at least two 1,2-epoxide groups per molecule,
(A2) optionally mono-epoxides, and
(A3) one or more amines selected from:
    (A31) amines of the formula I

in which
$R^1$ is a branched or unbranched aliphatic, cycloaliphatic, araliphatic or aromatic hydrocarbon radical having 1 to 30 carbon atoms which is unsubstituted or substituted by hydroxyl, alkoxy or halogen groups,
$R^2$ and $R^3$ independently of one another are each hydrogen or $R^1$ and, if $R^2$ and $R^3$ are hydrogen, the remaining radical $R^1$ is one of the following substituents

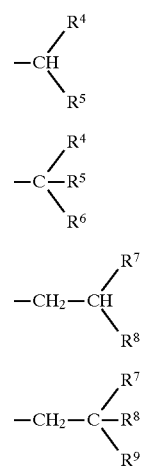

in which the radicals
$R^4$ to $R^9$ independently of one another are each a branched or unbranched aliphatic, cycloaliphatic, araliphatic or aromatic hydrocarbon radical having 1 to 30 carbon atoms which is unsubstituted or substituted by hydroxyl, alkoxy or halogen groups, and
$R^1$ and $R^2$ can form a substituted or unsubstituted cycloaliphatic ring having up to 8 carbon atoms, in which case $R^3$ is then a hydrogen atom, and (A 32) amines of the formula II

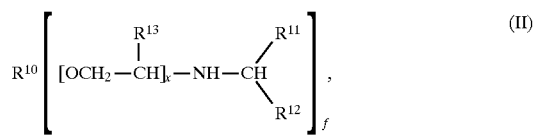

in which
$R^{10}$ is

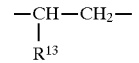

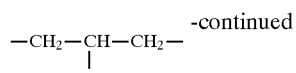

-continued

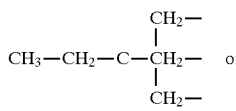   or

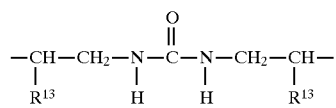

$R^{11}$ and $R^{12}$ independently of one another are each hydrogen, a saturated or unsaturated straight-chain, branched or cyclic (with or without heteroatoms in the ring) alkyl having up to 15 carbon atoms, or together are a cyclic alkylene radical having up to 8 carbon atoms which is unsubstituted or substituted up to three times by alkyl groups having 1 to 3 carbon atoms, $R^{13}$ is hydrogen or methyl, x is an integer from 1 to 100, and f is 2 or 3, and (A 33) amines of the formula III

in which
  $R^{14}$ is an alkylene, cycloalkylene or aralkylene radical which is unsubstituted or substituted by hydroxyl, ether or halogen groups,
  $R^{15}$ and $R^{16}$ are alkyl or, independently of one another, are a cycloalkyl or aralkyl radical which is unsubstituted or substituted by hydroxyl, ether or halogen groups, wherein radicals $R^{15}$ and $R^{16}$ are optionally connected, optionally via heteroatoms, with the proviso that in all cases at least one of the substituents $R^{14}$, $R^{15}$ or $R^{16}$ in α- and/or β-position to each nitrogen atom is branched and/or that the nitrogen is attached as a ring atom;

(B) cyclocarbonates which are reaction products of the compounds (A) and (B1) carbon dioxide;

(C) cyclocarbonates which are reaction products of
  (C1) compounds having at least two 1,2-epoxide groups per molecule, obtained from
    (C11) compounds having at least two 1,2-epoxide groups per molecule
    (C12) optionally with monoepoxides and
    (C13) polyoxyalkyleneamines, and
  (C2) carbon dioxide;

(D) 1,2-epoxide compounds which are not identical to (A1), (A2), (C11), (C12) and/or are unreacted portions of compounds (A1), (A2), (C11) and (C12) from the preparation of the compounds (A) and (C1);

(E) polyamines having at least two secondary amino groups; and (F) further additives.

In a preferred embodiment of the invention, hydroxyalkylurethane-modified hardeners are obtained by the direct addition of carbon dioxide onto epoxides which carry tertiary basic nitrogen, and the further reaction of the addition products with polyamines. The hardeners obtained in this way can be used to produce coatings which dry rapidly and are free from tack.

According to another aspect of the present invention, there has been provided an adhesive composition which includes the hardener containing epoxy resin and a method for adhering substrates. According to another aspect of the present invention, there has been provided a coating composition which includes the hardener containing epoxy resin and a method for coating substrates.

According to yet another aspect of the present invention, there has been provided a method for producing the hardener of the present invention which comprises reacting one or more compounds of (A), (B) and (C) with compound (E) and optionally one or more compounds of (D) and (F), wherein compounds (A–F) are defined as above.

Further objects, features and advantages of the present invention will become apparent from the detailed description of preferred embodiments which follows.

DETAILED DESCRIPTION OF THE PREFERRED EMBODIMENTS

The hardener composition for epoxy resin of the present invention, described below, surprisingly do not show these disadvantages of the related art described above. Curable compositions comprising these hardeners and compounds containing epoxy groups (epoxy resins) instead give well-adhering coatings or adhesives, sheetlike structures, sealing compounds, moldings and the like of high elasticity and good crack-bridging properties, even at temperatures below 0° C. The hardeners according to the invention can be prepared without solvent in a simple manner.

The hardener compositions comprise the reaction products of (A) compounds containing at least two 1,2-epoxide groups, which are reaction products of
  (A1) compounds having at least two 1,2-epoxide groups per molecule
  (A2) alone or mixed with mono-epoxides and
  (A3) one or more amines selected from:
    (A31) amines of the formula I

in which
  $R^1$ is a branched or unbranched aliphatic, cycloaliphatic, araliphatic or aromatic hydrocarbon radical having 1 to 30 carbon atoms which is unsubstituted or substituted by hydroxyl, alkoxy or halogen groups,
  $R^2$ and $R^3$ independently of one another are each hydrogen or $R^1$ and, if $R^2$ and $R^3$ are hydrogen, the remaining radical $R^1$ is one of the following substituents

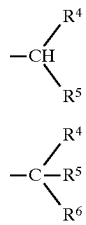

-continued

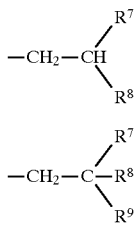

in which the radicals
R$^4$ to R$^9$ independently of one another are each a branched or unbranched aliphatic, cycloaliphatic, araliphatic or aromatic hydrocarbon radical having 1 to 30 carbon atoms which is unsubstituted or substituted by hydroxyl, alkoxy or halogen groups, and
R$^1$ and R$^2$ can form a substituted or unsubstituted cycloaliphatic ring having up to 8 carbon atoms, in which case R$^3$ is then a hydrogen atom;

(A 32) amines of the formula II

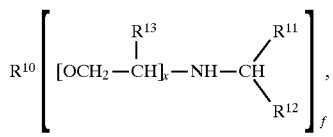

in which
R$^{10}$ is

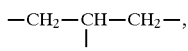

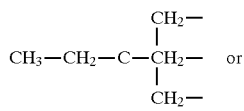

R$^{11}$ and R$^{12}$ independently of one another are each hydrogen, a saturated or unsaturated straight-chain, branched or cyclic (with or without heteroatoms in the ring) alkyl having up to 15 carbon atoms, or together are a cyclic alkylene radical having up to 8 carbon atoms which is unsubstituted or substituted once, twice or three times by alkyl groups having 1 to 3 carbon atoms,
R$^{13}$ is hydrogen or methyl,
x is an integer from 1 to 100, and
f is 2 or 3; and (A 33) amines of the formula III

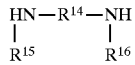

in which
R$^{14}$ is an alkylene, cycloalkylene or aralkylene radical which is unsubstituted or substituted by hydroxyl, ether or halogen groups,
R$^{15}$ and R$^{16}$ are alkyl or, independently of one another, are a cycloalkyl or aralkyl radical which is unsubstituted or substituted by hydroxyl, ether or halogen groups, it being possible for both radicals to be connected, possibly via heteroatoms, with the proviso that at least one of the substituents R$^{14}$, R$^{15}$ or R$^{16}$ in α- and/or β-position to each nitrogen atom has a branch, i.e. carries at least one methyl group, and/or that the nitrogen is attached as a ring atom, and/or (B) cyclocarbonates which are reaction products of the compounds (A) and (B1) carbon dioxide, and/or (C) cyclocarbonates which are reaction products of
  (C1) compounds having at least two 1,2-epoxide groups per molecule, obtained from
    (C11) compounds having at least two 1,2-epoxide groups per molecule
    (C12) with or without monoepoxides and
    (C13) polyoxyalkyleneamines, and
  (C2) carbon dioxide, and (D) optionally, 1,2-epoxide compounds which are not identical to (A1), (A2), (C11), (C12) and/or are unreacted portions of compounds (A1), (A2), (C11) and (C12) from the preparation of the compounds (A) and (C1), and (E) polyamines having at least two secondary amino groups, and (F) optionally, further additives described in detail below.

Suitable components (A1, C11 and D) are generally epoxide compounds known in the art for hardening purposes, which contain on average more than one epoxide group, preferably two epoxide groups, per molecule. It is also possible to employ mixtures of polyepoxides with monoepoxides (A2, C12, D). These epoxide compounds (epoxy resins) can in this case be either saturated or unsaturated and aliphatic, cycloaliphatic, aromatic or heterocyclic and can also have hydroxyl groups. They may, furthermore, contain those substituents which generally do not give rise under the mixing or reaction conditions to disruptive side reactions, examples being alkyl or aryl substituents, ether groups and the like. They are preferably glycidyl ethers which are derived from polyhydric phenols, especially bisphenols, and novolaks and whose "epoxide equivalent weights" (molar mass divided by the number of epoxide compounds per molecule) are preferably between 100 and 500 g/mol, more preferably, between 150 and 250 g/mol.

Examples of polyhydric phenols which can be used include resorcinol, hydro-quinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1-bis(4-hydroxyphenyl)isobutane, 2,2-bis-(4-hydroxytert-butylphenyl)propane,bis(2-hydroxynaphthyl)methane, 1,5-dihydroxynaphthalene, tris(4-hydroxyphenyl)methane, bis (4-hydroxyphenyl) ether, bis (4-hydroxyphenyl) sulfone, etc. Further examples include the chlorination and bromination products of the abovementioned compounds, for example tetrabromobisphenol A. Particular preference is given to liquid diglycidyl ethers based on bisphenol A and bisphenol F, having an epoxide equivalent weight preferably of from 180 to 190 g/mol.

It is also possible to use polyglycidyl ethers of polyalcohols, for example 1,2-ethanediol diglycidyl ether, 1,2-propanediol diglycidyl ether, 1,3-propanediol diglycidyl ether, butanediol diglycidyl ethers, pentanediol diglycidyl ethers (also neopentylglycol diglycidyl ethers), hexanediol diglycidyl ethers, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, mixed polyoxyethylene-propylene glycol diglycidyl ethers, polyoxytetramethylene glycol diglycidyl ethers, polyglycidyl ethers of glycerol, of 1,2,6-hexanetriol, of trimethylolpropane, of trimethylolethane, of pentaerythritol and of sorbitol, polyglycidyl ethers of alkoxylated polyols (for example, those of glycerol, trimethylolpropane or pentaerythritol), diglycidyl ethers of cyclohexanedimethanol, of bis(4-hydroxycyclohexyl) methane and of 2,2-bis(4-hydroxycyclohexyl)propane, polyglycidyl ethers of castor oil, and triglycidyl tris(2-hydroxyethyl)isocyanurate. Polyoxypropylene glycol diglycidyl ethers having an epoxide equivalent weight of from 150 to 800, in particular from 300 to 400 g/mol are highly preferred.

In another embodiment it is possible in addition to the polyglycidyl ethers to use generally small quantities (components A2, C12 and D) of reactive diluents (monoepoxides), in quantities of up 30%, preferably from 10 to 20%, based on the mass of the polyglycidyl ethers. Examples of suitable compounds are methyl glycidyl ether, butyl glycidyl ether, allyl glycidyl ether, ethylhexyl glycidyl ether, long-chain aliphatic glycidyl ethers such as cetyl glycidyl ether and stearyl glycidyl ether, monoglycidyl ethers of a higher isomeric alcohol mixture, glycidyl ethers of a mixture of $C_{12}$ and $C_{13}$ alcohols, phenyl glycidyl ethers, cresyl glycidyl ethers, p-tert-butylphenyl glycidyl ethers, p-octylphenyl glycidyl ethers, p-phenylphenyl glycidyl ethers, glycidyl ethers of an alkoxylated lauryl alcohol, and also monoepoxides such as epoxidized monounsaturated hydrocarbons (butylene oxide, cyclohexene oxide, styrene oxide) and halogen-containing epoxides, such as epichlorohydrin.

Further suitable components A1, C11 and D are poly(N-glycidyl) compounds, which are obtainable by dehydrohalogenation of the reaction products of epichlorohydrin and amines such as aniline, n-butylamine, bis(4-aminophenyl)-methane, m-xylylenediamine or bis(4-methylaminophenyl)-methane. The poly(N-glycidyl) compounds can also include triglycidyl isocyanurate, triglycidylurazole and oligomers thereof, N,N'-diglycidyl derivatives of the cycloalkyleneureas and diglycidyl derivatives of hydantoins, etc.

Furthermore, it is also possible to use as components A1, C11 and D polyglycidyl esters of polycarboxylic acids, which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, tetrahydrophthalic acid, hexahydrophthalic acid, 2,6-naphthalenedicarboxylic acid and higher dicarboxylic acid diglycidyl esters, for example, dimerized or trimerized linolenic acid. Examples are diglycidyl adipate, diglycidyl phthalate and diglycidyl hexahydrophthalate. Other components which may be used are glycidyl esters of unsaturated carboxylic acids and epoxidized esters of unsaturated alcohols or unsaturated carboxylic acids. It is also possible to use mixtures of two or more epoxy resins.

A detailed listing of further suitable epoxide compounds can be found in the handbook "Epoxidverbindungen und Epoxidharze" [Epoxide Compounds and Epoxy Resins] by A. M. Paquin, Springer Verlag, Berlin 1958, chapter IV, and in Lee Neville "Handbook of Epoxy Resins", 1967, chapter 2, which is incorporated by reference in its entirety.

Suitable amines (A31) for preparing the 1,2-epoxide compounds (A) according to the invention are tert-alkylamines having 4 to 22 carbon atoms, and preferably those of the formula IV

in which $R^{18}$ and $R^{19}$ have the meaning of $R^1$ described above or $R^{18}$ and $R^{19}$ can form a substituted or unsubstituted cycloaliphatic ring having up to 8 carbon atoms. Examples of the amines preferably employed are tert-butylamine (2-methyl-2-aminopropane), 2-methyl-2-butylamine, tert-alkylamines of the Rohm and Haas Company, such as Primene® TOA (tert-octylamine=1,1,3,3-tetramethylbutylamine), Primene® 81 R (tert-alkylamine C 12 - C 14), Primene® JM-T (tert-alkylamine C 16 - C 22), 2-amino-2-methyl-l-propanol, 2-amino-2-ethyl-1,3-propanediol, tris(hydroxymethyl)aminomethane, isopropylamine (2-propanamine), sec-butylamine(2-aminobutane), 2-amino-1-butanol, 3-methyl-2-butylamine, 2-pentylamine, 3-pentylamine, cyclopentylamine, 4-methyl-2-pentylamine, cyclohexylamine, 2-heptylamine, 3-heptylamine, 1-methylheptylamine, 2-methylcyclohexylamine, 4-tert-butylcyclohexylamine, 3-amino-2,4-dimethylpentane, 6-methyl-2-aminoheptane, 1-phenylethylamine, 1-methyl-3-phenylpropylamine, cyclododecylamine. 2-aminobutane and cyclohexylamine are particularly preferred.

Also suitable are isobutylamine (2-methyl-1-propanamine), 2-methylbutylamine (1-amino-2-methylbutane), isoamylamine (isopentylamine=1-amino-3-methylbutane), furfurylamine, benzylamine, 4-methoxybenzylamine, 2-ethylhexylamine, isononylamine (mixture of isomeric nonylamines comprising about 90% 3,5,5-trimethylhexylamine), etc, with 2-ethyl-hexylamine being particularly preferred.

As secondary amines (A32) it is preferred to employ secondary polyetherdiamines, with the disecondary amines being particularly preferred. Preferred disecondary amines include products marketed by Condea Chemie GmbH under the name ®Novamin. Among those suitable are the secondary polyetheramines ®Novamin N 10 (mean molecular mass in g/mol 390), N 20 (560), N 40 (2150) and N 50 (4150), with the secondary polyetherdiamines ®Novamin N 20 and ®Novamin N 40 being particularly preferred.

Compounds suitable as amines (A33) are those of the formula (III), with examples of those employed being N,N'-diisopropylethylenediamine, N,N'-di-tert-butylethylenediamine, N,N'-diisopropyl-1,3-propanediamine, 1,3-bis(tris(hydroxymethyl)methylamino) propane, piperazine, 2-methylpiperazine, 2,5-dimethylpiperazine, 2,6-dimethylpiperazine, homopiperazine and 4,4'-tri-methylenedipiperidine. Also suitable are amines which are reaction products of primary diamines which in the α-and/or β-position to each nitrogen atom have a branch, i.e., carry at least one methyl group, with monoepoxides such as the monoglycidyl ethers described (A2, C2, D). In this context, 1 mol of monoepoxide is employed per primary amino group. In the case of these amines, in formula (III) the radicals $R^{15}$ and $R^{16}$ are

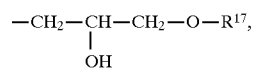

where $R^{17}$ is an alkyl, cycloalkyl, aralkyl or aryl radical which is unsubstituted or substituted by hydroxyl, ether or halogen groups. Examples of suitable diamines are neopentanediamine (2,2-dimethyl-1,3-propanediamine), 1,2- diamino-2-methylpropane, diaminocyclohexane such as 1,2-diaminocyclohexane and 1,4-diaminocyclohexane, xylylenediamines, such as m-xylylenediamine, 1,3-bis-(aminomethyl)cyclohexane, 1-amino-2-aminomethyl-3,3,5 (3,5,5)-trimethylcyclopentane, triacetonediamine (4-amino-2,2,6,6-tetramethylpiperidine), 1,8-diamino-p-menthane, isophoronediamine (3-aminomethyl-3,5,5-trimethylcyclohexylamine), 4,4'-diaminodicyclohexylmethane, 3,3'-dimethyl-4,4'-diaminodicyclohexylmethane, and the isomer mixture of "TCD-diamine" (3(4),8(9)-bis(aminomethyl)tricyclo [5.2.1.0$^{2,6}$]decane). Mixtures of the amines (A31), (A32) and (A33) can also be used.

The epoxide compounds (A) according to the invention are prepared by reacting the epoxides (A1) and, if appropriate, (A2) with the amines (A3), with stirring and generally with heating, until the theoretically calculated epoxide equivalent weight has been reached, i.e., until all of the active hydrogen atoms of the amine have reacted with the excess of epoxide groups present. The temperatures for this reaction are generally from 25° to 200° C., preferably from 50° to 150° C., in particular from 60° to 130° C. Depending on the temperature and the epoxides and amines employed, the reaction times are in general between a few minutes and a number of hours.

In the majority of cases, no addition of catalyst is necessary for quantitative reaction of the amines with the epoxides. It is advantageous, especially in the case of low-boiling amines, to operate with an excess pressure of, for example, up to 5 bar.

In the preparation of the epoxide compounds (A) according to the invention it is also possible to employ different epoxides (A1) and, if appropriate, (A2) as a mixture and to react this mixture directly with the amines (A3). However, it is also possible to carry out a targeted, stepwise build-up using various epoxides in succession, by first reacting an epoxide I (A1) and, if appropriate, (A2) with an excess of the amines, for example, 2 active amine hydrogen atoms per epoxide group. After complete reaction of the epoxide groups of the epoxide I, a further epoxide II (A1) is reacted and, if appropriate (A2), in excess with the active amine hydrogen atoms still available.

In an analogous manner, it is also a possibility to use various amines (A3) either as a mixture or else in a stepwise build-up. In the respective intermediate stages with an excess of amine, it is possible to remove free residual amine by distillation, if desired under reduced pressure. It is also possible to prepare any desired mixtures of the epoxides of the invention, for example in order to achieve defined processing viscosities and properties of the cured systems.

For the synthesis of the cyclocarbonates (B) and (C), reference is made to the abovementioned literature. Patent Documents EP 0 212 409 and EP 0 229 622 which are incorporated by reference in their entireties, describe suitable preparation methods and effective catalysts. The components (B) and (C) according to the present invention are preferably obtained by solvent-free procedures under atmospheric pressure. Surprisingly, it is possible in this context to employ temperatures as known from the carbonation of conventional epoxides without any self-polymerization of the epoxide compounds which contain basic nitrogen groups. In this case, the reaction time can fluctuate within broad limits.

In general, the reaction is carried out such that the epoxide groups are almost completely consumed by reaction with carbon dioxide. However, the reaction can also be terminated at any desired point, to give compounds containing not only carbonate groups but also intact epoxide groups.

This provides the advantage that the content of urethane groups can be controlled, depending on the performance properties desired, by way of the subsequent reaction with the polyamines (E). In general, from 10 to 95%, preferably from 30 to 90%, of the epoxide groups are converted into the cyclocarbonate.

Suitable compounds (C11) and (C12) have been described above. Examples of suitable polyoxyalkyleneamines (C13) are polyoxyalkylenediamines and polyoxyalkylenemonoamines. Examples of suitable polyoxyalkylenediamines are compounds of the formula:

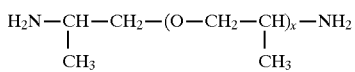

such as ®Jeffamine D 230 (average molecular mass M=230 g/mol), ®Jeffamine D 400 (M=400 g/mol), ®Jeffamine D 2000 (M=2000 g/mol) and others from Huntsman Corporation. Also suitable are compounds of the formula:

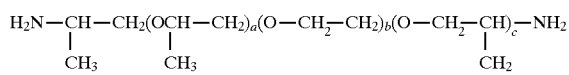

such as ®Jeffamine ED 600 (M=600 g/mol (a+c=2.5; b=8.5); ®Jeffamine ED 900 (M=900 g/mol) (a+c=2.5; b=15.5); ®Jeffamine ED 2001 (M=2000 g/mol) (a+c=2.5; b=40.5), and others, likewise from Huntsman Corporation.

The polyoxypropylenemonoamines, which have proven particularly useful for forming the epoxides (A), are compounds of the formula:

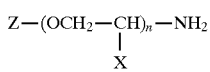

in which X is hydrogen or a methyl or ethyl radical, Z is a hydrocarbon radical having 1 to 5 carbon atoms, and n is an average value which preferably lies between 2 and 50.

Preferred polyoxyalkylenemonoamines are those of the formula:

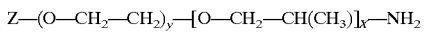

in which Z is a hydrocarbon radical having 1 to 5 carbon atoms, especially a methyl radical, and, independently of one another, y is from 0 to 10 and x is from 1 to 41 and, in a further embodiment, y is from 1 to 41 and x is from 1 to 12.

Among the monoamine block polymers described above having oxyethylene and oxypropylene groups, selected examples are marketed, for instance, by Huntsman Corporation under the tradename ®Jeffamine M series, particularly ®Jeffamine grades M 600, M 1000, M 2005 and M 2070.

The epoxide compounds (C1) are prepared by reacting the epoxides (C11) and, if appropriate, (C12) with the polyalkyleneamines (C13), with stirring and generally with heating, until the theoretically calculated epoxide equivalent weight has been reached, i.e., until all of the active hydrogen atoms of the polyoxyalkyleneamine have reacted with the excess epoxide groups present. In this reaction, the temperatures are in general maintained at from 25° to 200° C., preferably from 50° to 150° C. and, in particular, from 80° to 130° C. Depending on the temperature and the epoxides and amines employed, the reaction times are in general between a few minutes and a number of hours. In most cases, no additional catalysts are necessary for quantitative reaction of the amines with the epoxides.

In the preparation of the epoxide compounds (C1), it is also possible to employ various epoxides (C11) and, if appropriate, (C12) as a mixture and to react this mixture directly with the polyoxyalkyleneamines (C13).

In another embodiment, it is also possible to carry out a targeted, stepwise build-up using various epoxides in succession, by first reacting an epoxide I (C11) with an excess of the polyoxyalkyleneamines, for example 2 active amine hydrogen atoms per epoxide group, and, after complete reaction of the epoxide groups of the epoxide I, reacting a further epoxide II (C11) and, if appropriate, (C12) in excess with the active amine hydrogen atoms still available.

As amine component (C13), it is preferred to use polyoxyalkylenemonoamines, for example, polyoxyethylene- and polyoxypropylene-monoamines. Examples are amines of the Jeffamine M series and low molecular weight amines such as methoxyethylamine, methoxyethoxyethylamine, higher oligomers and their homologs (oxypropylene derivatives).

In a preferred embodiment, the compounds (C) are prepared by reacting compounds (C11) selected from the group consisting of the diglycidyl ethers of bisphenol A and bisphenol F with polyoxyalkylenemonoamines (C13) having molecular masses of from 130 to 5000 g/mol and carbon dioxide (C2).

Like the compounds according to (A1, C11), the epoxide compounds (D) are selected from the group consisting of the polyepoxides having at least two epoxide groups per molecule. If desired, they can also be used as a mixture with the monoepoxides (A2, C12) and, if appropriate, (A2). In general, they are different from the compounds employed as (A1, C11). The epoxide compounds (D) can include, however, unreacted residues of epoxide compounds (A1, C11) and, if appropriate, (A2, C12) from the preparation of the epoxy resins (A) and (C1).

Examples of polyamines (E) are aliphatic amines, such as the polyalkylenepolyamines, diethylenetriamine and triethylenetetramine, tetraethylenepentamine, pentaethylenehexamine, 2,2,4- and/or 2,4,4-trimethylhexamethylenediamine, bis(3-aminopropyl) methylamine, 1,4-bis(3-aminopropyl)piperazine, N,N-bis(3-aminopropyl)-ethylenediamine, 2-methylpentanediamine (®Dytek A), oxyalkylenepolyamines, such as polyoxypropylenedi- and -triamines and 1,13-diamino-4,7,10-trioxatridecane, cycloaliphatic amines, such as isophoronediamine (3,5,5-trimethyl-3-aminomethylcyclohexylamine), 4,4'-diaminodicyclohexylmethane, 3,3'-dimethyl-4,4'-diaminodicyclohexylmethane, N-cyclohexyl-1,3-propanediamine, diaminocyclohexanes, especially 1,2-diaminocyclohexane, 1,4-diamino-3,6-diethylcyclohexane, 1,2-diamino-4-ethylcyclohexane, 1-cyclohexyl-3,4-diaminocyclohexane, 2,2-bis(4-aminocyclohexyl)propane, 1,3- and 1,4-bis(aminomethyl)-cyclohexane, piperazine, N-aminoethylpiperazine, TCD diamine (3(4),8(9)-bis (aminomethyl)tricyclo[5.2.1.0 $^{2,6}$] -decane), araliphatic amines, such as xylylenediamines (m- and p-xylylenediamine), aromatic amines such as phenylenediamines, 4,4'-oxydianiline and 4,4'-diaminodiphenylmethane.

For the preparation of the hardeners according to the invention, the epoxide compounds (A) and, if desired, (D) and/or the cyclocarbonates (B) and/or (C) are generally added, in portions or by metered addition over the course of from 0.3 to 10 hours, preferably over the course of from 0.3 to 3 hours, at from 20° to 200° C., preferably from 40° to 120° C., to the polyamines (E), if desired in the presence of a solvent (in this respect cf. (F)). The epoxide compounds and the cyclocarbonates can in this context be added individually in any desired sequence or as mixtures. The polyamines (E) can be present in any desired excess relative to the epoxide and/or carbonate groups. The polyamines (E) employed are preferably used in quantities such that the ratio of the reactive epoxide groups to the hydrogen atoms present on the nitrogen is preferably from 1:2 to 1:10 and/or the ratio of the reactive carbonate groups to the hydrogen atoms present on the nitrogen is preferably from 1:3 to 1:10.

The hardeners according to the invention are suitable for curing polyfunctional epoxide compounds, and in certain embodiments also for curing aqueous epoxy resins and aqueous epoxy resin dispersions.

In general, the epoxy resins are cured with the hardeners according to the invention in the presence of further additives (F), which if desired can also be added beforehand to the hardeners.

Thus, for example, it is sometimes necessary to add an additive (F) in the form of diluents, generally in quantities of from 1 to 40%, preferably from 5 to 20%, based on the hardener. Examples of these diluents are organic solvents, such as ethylene glycol monoethers or diethers, propylene glycol monoethers or diethers, butylene glycol monoethers or diethers with monoalcohols having a linear or branched alkyl radical of 1 to 6 carbon atoms, tetrahydrofuran, aliphatic alcohols having linear or branched alkyl radicals of 1 to 12 carbon atoms, such as methanol, ethanol, propanol, butanol, araliphatic or cycloaliphatic alcohols, such as benzyl alcohol or cyclohexanol, (cyclo)aliphatic or aromatic hydrocarbons, such as hexane, heptane, cyclohexane, toluene, Solvesso®, or ketones, such as acetone, methyl isobutyl ketone and cyclohexanone.

The boiling point of these solvents is preferably not more than 210° C. Mixtures of the various diluents are also possible.

Other additives (F) include hydroxyl-containing solvents, such as benzyl alcohol, 2-methylbenzyl alcohol, 1-phenylethanol, 2-phenoxyethanol, furfuryl alcohol, pine oil and alcohols having 2 to 18 carbon atoms, such as n-butanol, ethylhexyl alcohol, ethylglycol methylglycol, methoxypropanol and ethoxypropanol, which in general, have an accelerating effect on the curing reaction.

The additives (F) for the novel hardeners can also include further customary additives, for example accelerators or curing catalysts, further hardeners and additional curable resins or extender resins, and also the customary coating additives, such as pigments, pigment pastes, antioxidants, leveling agents or thickeners (thixotropic agents), antifoams and/or wetting agents, reactive diluents, fillers, flame retardants and the like. These additives can, if desired, be added to the curable mixtures just before processing.

Accelerators or curing catalysts which can be preferably employed, apart from the above hydroxyl-containing solvents, are, for example, phenols and alkylphenols having 1–12 carbon atoms in the alkyl group, such as cresol, the various xylenols, nonylphenol, polyphenols such as bisphenols A and F, OH-containing aromatic carboxylic acids, such as salicylic acid, m-hydroxybenzoic acid and p-hydroxybenzoic acid, and also tertiary amines, such as dimethylaminobenzylamine, 1,3,5-tris(dimethylamino) phenol and the like.

Further additives (F) include suitable additional hardeners are the customary epoxy hardeners, such as basic hardeners (amine hardeners), for example polyamines, Mannich bases and adducts of polyamines (in excess) with polymers, such as polyepoxides; and also phenol-modified amine hardeners, and customary polyamidoamines or polyimidazolines, which are prepared by condensing monobasic fatty acids and/or polymeric fatty acids, obtained by catalytic polymerization of mono- or polyunsaturated fatty acids or by copolymerization of polymerizable compounds, for example styrene. With regard to further customary hardeners, reference is made for example to EP-A 272 595 which is incorporated by references in its entirety.

Additives (F) also include additional curable resins examples of which are hydrocarbon resins, phenoxy resins, phenolic resins, polyurethane resins, polysulfides (Thiokols), reactive, liquid polymers of butadiene or corresponding acrylonitrile/ butadiene copolymers (Hycar types), while customary extender resins which can be mentioned here are, inter alia, nonreactive epoxy resin modifiers, pine oil, tars, phthalates and coumarone oils.

Additive (F) also include leveling agents examples of which are acetals, such as polyvinylformal, polyvinylacetal, polyvinylbutyral, polyvinylacetobutyral, etc., poly-ethylene glycols and polypropylene glycols, silicone resins, mixtures of zinc soaps, of fatty acids and aromatic carboxylic acids, and especially commercial products based on polyacrylates. The leveling agents can preferably also be added to component (A) in quantities of 0.1–4%, more preferably 0.2–2.0%, based on the overall composition.

Adhesion promoters and hydrophobicizing agents can also be used as additives. They can include, inter alia, silanes. These can react both with the inorganic substrate and with the organic polymer (adhesive, coating composition or the like) to form strong bonds. Through the promotion of adhesion it is possible to enhance the mechanical values, especially after exposure to moisture. Appropriate products are offered, for example, under the name ®Dynasylan from Hüls Aktiengesellschaft, Marl, Germany or as ®Silan from Degussa AG.

Dyes and pigments can be used according to the invention as additives (F) and can be either inorganic or organic in nature. Examples which may be mentioned are titanium dioxide, zinc oxide, carbon black, conductivity black such as, for example, ®Printex XE 2 from Degussa AG. The organic dyes and pigments are selected such that they are stable in the curing temperatures and do not lead to any unacceptable shifts in color shade.

Examples of suitable fillers which can be used according to the invention as additives (F), are, quartz flour, silicates, chalk, gypsum, kaolin, mica, barite, organic fillers such as polyamide powders, organic and inorganic fibers and the like. Thixotropic agents and thickeners which can be used are, for example, ®Aerosil (highly disperse silica, for example of grades 150, 200, R 202, R 805 from Degussa), bentonite grades (e.g. ®Sylodex 24 from Grace, ®Bentone, NL Chemicals).

The incorporation of the additives (F) into the fully reacted hardener comprising components (A) to (E) is generally carried out using forcing mixers, for example dissolvers and kneading apparatus, double-Z mixers and extruders.

The hardeners are preferably not mixed with the epoxide compounds, aqueous epoxy resins or aqueous epoxy resin dispersions until directly before use.

Owing to their outstanding performance properties, the hardeners of the invention are suitable, in combination with appropriate epoxy resins and additives, for the production of coatings, intermediate coatings, coating materials (for example as paint ingredients), molding compositions and curable compositions for a very wide range of applications.

For example, they can be used for producing protective and decorative coatings on a very wide variety of organic and inorganic substrates, for example wood, rubber, leather, textiles, plastics (for example polyethylene, polypropylene, etc), mineral substrates (for example concrete and masonry), fiber cement, ceramic, glass, composite materials and pretreated or unpretreated metals.

The mixtures according to the invention are particularly suitable for coatings, adhesives, putties, sealing compounds and moldings in many areas of application where there is a requirement for good adhesion, high impact strength and improved flexibility and elasticity, such as, for example, in the construction sector for crack-bridging coatings and joint fillings, and as an additive to plastic cements. The mixtures can be applied by customary methods, such as painting, spraying, knife-coating, immersion, pouring, rolling or deposition as a bead of adhesive from suitable equipment, etc. The coatings are then usually cured, at room temperature or, if desired, at elevated temperatures.

In the examples below, the following abbreviations and units are used:

| Term | Explanation | | Unit |
|---|---|---|---|
| molar mass, molecular mass, fomlerly "molecular weight" | mass m per amount n of substance | $M = m/n$ | g/mol |
| epoxide functionality | mean number of epoxide groups per molecule | $v_E$ | |
| amine hydrogen functionality | mean number of amine hydrogen atoms per molecule | $v_{NH}$ | |
| epoxide equivalent, EEQ value, EEQ | mean molar mass divided by mean number of epoxide groups per molecule | $M_E = M/v_E$ | g/mol |
| epoxide number | content by mass of epoxide oxygen atoms | $m(O)/m$ | g/100 g |
| amine hydrogen equivalent, HAQ value, HAQ | mean molar mass divided by mean number of amine hydrogen atoms per molecule | $M/v_{NH}$ | g/mol |
| amine number, AN | mass of KOH, $m_{KOH}$, which would be necessary to neutralize the quantity of acid required to neutralize the amine, divided by the mass m of the respective substance | $AN = v_{NH} \cdot m_{(KOH)}/m$ | mg/g |

EXAMPLE 1

In a four-necked flask with stirrer, thermometer and condenser, 110 g of 2-aminobutane are added under nitrogen to 240 g of ®Beckopox EP 075 (polyoxypropylene glycol diglycidyl ether, Hoechst) having an epoxide equivalent (EEQ) of 340 g/mol. The reaction mixture is heated to 600° C. and held at this temperature for two hours, then heated slowly to 120° C. over the course of two hours and held for four hours until the epoxide equivalent has reached a value of 737 g/mol. The reaction product is immediately cooled to room temperature. The viscosity at 250° C. is 440 mPa.s and the amine number is 42.9 mg/g.

EXAMPLE 2

In a four-necked flask with stirrer, thermometer and condenser, 1.43 g of potassium iodide are added to 420 g of the amine-modified epoxy resin from Example 1, and carbon dioxide is passed in. The mixture is heated to 120° C. over the course of 15 minutes and held at this temperature for a total of 23 hours while passing in $CO_2$ continuously. During this time, the epoxide number falls from 2.17 to 0.10 g/100 g. The cyclocarbonate obtained is cooled to room temperature. The viscosity at 25° C. is 1890 mpa.s.

EXAMPLE 3

In a four-necked flask with stirrer, thermometer and condenser, 64.6 g of 2-ethylhexylamine are added under nitrogen to 680 g of ®Beckopox EP 075 (see Example 1). The reaction mixture is heated to 100° C. over the course of 40 minutes and held at this temperature for 75 minutes, and then held at 120° C. for a further 3.5 hours until the epoxide equivalent has reached a value of 777 g/mol. The reaction product is immediately cooled to room temperature. The viscosity at 25° C. is 415 mpa.s.

EXAMPLE 4

In a four-necked flask with stirrer, thermometer and condenser, 2.41 g of potassium iodide are added to 759 g of the amine-modified epoxy resin from Example 3, and carbon dioxide is passed in. The mixture is heated to 120° C. and held at this temperature for 30 hours while passing in $CO_2$ continuously. During this time, the epoxide number falls from 2.04 to 0.06 g/100 g. The cyclocarbonate obtained is cooled to room temperature. The viscosity at 25° C. is 1690 mpa.s.

EXAMPLE 5

In a four-necked flask with stirrer, thermometer and condenser, 2100 g of ®Jeffamine M 1000 (according to the manufacturer's data sheet, polyoxyalkylenemonoamine with a molecular mass of 1000 g/mol and a PO/EO ratio of 3:19) are added under nitrogen to 2900 g of a liquid epoxy resin based on bisphenol A and having an epoxide equivalent (EEQ) of 183 g/mol. The mixture is then heated to 90° C. and held at this temperature until (about 6 hours) the EEQ remains constant. It is cooled to room temperature. The epoxy resin has the following characteristics:

Epoxide equivalent 419 g/mol
Amine number 23.2 mg/g
Viscosity 25*° C. 7794 mpa.s

EXAMPLE 6

In a four-necked flask with stirrer, thermometer and condenser, 5.94 g of potassium iodide are added to 1000 g of the amine-modified epoxy resin from Example 5, and carbon dioxide is passed in. The mixture is heated to 120° C. and held at this temperature for 23 hours while passing in $CO_2$ continuously. During this time, the epoxide number falls from 3.82 to 0.02 g/100 g. The cyclocarbonate obtained is emptied from the flask and cooled to room temperature. The product is highly viscous.

EXAMPLE 7

In a four-necked flask with stirrer, thermometer and condenser, 210 g of ®Jeffamine M 2005 (according to the manufacturer's data sheet, polyoxyalkylenemonoamine having a molecular mass of 2000 g/mol and a PO/EO ratio of 32:3) are added under nitrogen to 580 g of a liquid epoxy resin based on bisphenol A and having an epoxide equivalent (EEQ) of 183 g/mol. The mixture is then heated to 90° C. and held at this temperature until (about 2 hours) the EEQ remains constant at 260. Then 210 g of ®Jeffamine M 600 (according to the manufacturer's data sheet, polyoxyalkylenemonoamine having a molecular mass of 600 g/mol and a PO/EO ratio of 9:1) are added and the mixture is held again at 90° C. (for about 5 to 6 hours) until the EEQ remains constant at about 440 g/mol. The mixture is cooled to room temperature. The epoxy resin has the following characteristics:

Epoxide equivalent 439 g/mol
Amine number 26.3 mg/g
Viscosity 25° C. 17,350 mPa.s

EXAMPLE 8

In a four-necked flask with stirrer, thermometer and condenser, 10.5g of potassium iodide are added to 1500 g of the amine-modified epoxy resin from Example 7, and carbon dioxide is passed in. The mixture is heated to 120° C. and held at this temperature for 22 hours while passing in $CO_2$ continuously. During this time, the epoxide number falls from 3.64 to 0.54 g/100 g. The cyclocarbonate obtained is emptied from the flask and cooled to room temperature. The product is highly viscous.

EXAMPLE 9

In a four-necked flask with stirrer, thermometer and condenser, 422 g (0.57 mol of EP epoxide groups) of the epoxy resin from Example 1 are added to 78 g of m-xylylenediamine (2.29 mol of amine H). The mixture is then heated to 80° C. and held at this temperature for 2 hours. The reaction product is cooled to room temperature. The viscosity at 25° C. is 15,990 mPa.s, the amine number is 162 mg/g and the HAQ is 291 g/mol.

EXAMPLE 10

In a four-necked flask with stirrer, thermometer and condenser, 782 g of the cyclocarbonate from Example 2 are added under nitrogen to 136 g of m-xylylenediamine (4 mol of amine H). The mixture is then heated to 80° C. and held at this temperature for 2 hours. The reaction product is cooled to room temperature. The viscosity at 25° C. is 62,060 mPa.s, the amine number is 95 mg/g and the HAQ is 459 g/mol.

EXAMPLE 11

75 g of ethylenediamine (5 mol of amine H) and 925 g (1.25 mol of EP groups) of the epoxy resin from Example 1 are reacted as in Example 9. The viscosity at 25° C. is 11,280 mPa.s, the amine number is 174 mg/g and the HAQ is 267 g/mol.

EXAMPLE 12

30 g of ethylenediamine (2.13 mol of amine H) and 391 g of the cyclocarbonate from Example 2 are reacted as in Example 10. The viscosity at 25° C. is 31,980 mPa.s, the amine number is 102 mg/g and the HAQ is 421 g/mol.

EXAMPLE 13

129 g of aminoethylpiperazine (3 mol of amine H) and 738 g (1 mol of EP groups) of the epoxy resin from Example 1 are reacted as in Example 9. The viscosity at 25° C. is 16,000 mPa.s, the amine number is 225 mg/g and the HAQ is 434 g/mol.

EXAMPLE 14

129 g of aminoethylpiperazine (3 mol of amine H) and 782 g of the cyclocarbonate from Example 2 are reacted as in Example 10. The reaction product has an HAQ of 456 g/mol.

EXAMPLE 15

118 g of m-xylylenediamine (3.47 mol of amine H) and 670 g (0.86 mol of EP groups) of the epoxy resin from Example 3 are reacted as in Example 9. The viscosity at 25° C. is 12,920 mPa.s, the amine number is 159 mg/g and the HAQ is 302 g/mol.

EXAMPLE 16

49 g of m-xylylenediamine (1.44 mol of amine H) and 290 g of the cyclocarbonate from Example 4 are reacted as in Example 10. The reaction product has an HAQ of 469 g/mol.

EXAMPLE 17

136 g of m-xylylenediamine (4 mol of amine H) and 463 g of the cyclocarbonate from Example 5 are reacted as in Example 10, but at 90° C. The reaction product has an HAQ of 300 g/mol.

EXAMPLE 18

136 g of m-xylylenediamine (4 mol of amine H) and 483 g of the cyclocarbonate from Example 6 are reacted as in Example 10, but at 90° C. The reaction product has an HAQ of 310 g/mol.

Using the epoxide- or carbonate-amine adducts of Examples 9 to 18, the hardeners of Examples 19 to 28 are formulated (see Table 1). In being so formulated, the respective epoxide-amine and carbonate-amine adducts are adjusted to approximately equal HAQ and, where possible, to about the same viscosity range.

The hardeners (Examples 19 to 28) are obtained by stirring the individual components together homogenously.

EXAMPLE 29

599 g of the carbonate-amine adduct of Example 17 are stirred together homogeneously with 75 g of m-xylylenediamine and 168 g of water at 50° C. The aqueous hardener has a viscosity of 18,440 mPa.s, an amine number of 155 mg/g and an HAQ of 200 g/mol (measured as an 80% strength solution).

EXAMPLE 30

Using the hardener of Example 29 and the 56% strength aqueous epoxy solid resin dispersion ®Beckopox VEP 2385 w (Hoechst AG) with an epoxide equivalent weight of about 500 g/mol based on solid resin, a (70±10) µm dry film is produced on glass and is tested.

Result:

| | | |
|---|---|---|
| VEP 2385 w (56% strength) | pbw | 100 |
| Hardener of Example 29 | pbw | 22 |
| Deionized water | pbw | 22 |
| Processing time | h | 2.75 |
| Drying to dust-dry in (according to DIN 53 150) | h | 0.50 |
| Surface tack after 24 h (assessed according to DIN 53 230) | | 0 |
| Pendulum hardness DIN 53 157 after | | |
| 24 h | s | 80 |
| 48 h | s | 90 |
| 7 days | s | 153 |

TABLE 1

| Hardener mixtures (parts by weight) | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|
| Epoxide-amine adduct Ex. 9 | 90 | | | | | | | | | |
| Carbonate-amine adduct Ex. 10 | | 80 | | | | | | | | |
| Epoxide-amine adduct Ex. 11 | | | 90 | | | | | | | |
| Carbonate-amine adduct Ex. 12 | | | | 80 | | | | | | |
| Epoxide-amine adduct Ex. 13 | | | | | 80 | | | | | |
| Carbonate-amine adduct Ex. 14 | | | | | | 75 | | | | |
| Epoxide-amine adduct Ex. 15 | | | | | | | 90 | | | |
| Carbonate-amine adduct Ex. 16 | | | | | | | | 75 | | |
| Carbonate-amine adduct Ex. 17 | | | | | | | | | 71.1 | |
| Carbonate-amine adduct Ex. 18 | | | | | | | | | | 71.1 |
| Aminoethylpiperazine | 5 | 10 | 5 | 10 | 13 | 17 | 10 | 15 | | |
| m-Xylylenediamine | | | | | | | | | 8.9 | 8.9 |
| Benzyl alcohol | 5 | 10 | 5 | 10 | 7 | 8 | — | 10.0 | 20.0 | 20.0 |
| Viscosity 25° C. in mPa·s | 7470 | 9114 | 5930 | 6560 | 3766 | 7357 | 7016 | 6047 | 48,300 | 65,354 |
| HAQ calculated in g/mol | 235 | 246 | 220 | 237 | 206 | 210 | 189 | 197 | 200 | 204 |

TABLE 2

| | \multicolumn{10}{c}{Test results of the elastic coatings} | | | | | | | | | |
|---|---|---|---|---|---|---|---|---|---|---|
| Beckopox EP 116 (EEQ 180) | 100 | 100 | 100 | 100 | 100 | 100 | 100 | 100 | 100 | 100 |
| Hardener of Ex. 19 | 131.6 | | | | | | | | | |
| Hardener of Ex. 20 | | 137.8 | | | | | | | | |
| Hardener of Ex. 21 | | | 123.2 | | | | | | | |
| Hardener of Ex. 22 | | | | 132.7 | | | | | | |
| Hardener of Ex. 23 | | | | | 115.4 | | | | | |
| Hardener of Ex. 24 | | | | | | 117.6 | | | | |
| Hardener of Ex. 25 | | | | | | | 105.8 | | | |
| Hardener of Ex. 26 | | | | | | | | 110.3 | | |
| Hardener of Ex. 27 | | | | | | | | | 112.0 | |
| Hardener of Ex. 28 | | | | | | | | | | 114.2 |
| Potlife at 23° C. in min | 180 | 60 | 150 | 50 | 120 | 30 | 150 | 60 | 45 | 35 |
| Drying to dust-dry in h (according to DIN 53 150) | >8<24 | 5.5 | >8<24 | 6 | 5.5 | 4 | 5.5 | 3 | 2.5 | 2.5 |
| Surface tack after 24 h (assessed acc. to DIN 53 230) | 0 | 0 | 0–1 | 0 | 0 | 0 | 0 | 0 | 0 | 0 |
| Pendulum hardness DIN 53 157 | | | | | | | | | | |
| after 24 h(s) | 13 | 21 | 10 | 19 | 23 | 38 | 28 | 59 | 63 | 87 |
| after 48 h(s) | 18 | 29 | 14 | 27 | 35 | 50 | 38 | 72 | 63 | 87 |
| after 7 days (s) | 26 | 48 | 27 | 56 | 52 | 55 | 54 | 86 | 81 | 109 |
| Elasticity | soft elast. | soft elast. | soft elast. | tough elast. | tough elast. | tough elast. | tough elast. | tough elast. | tough elast. | soft elast. |

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A hardener composition for epoxy resins, comprising reaction products of one or more compounds of (A), (B) and (C) with one or more compounds (E) and optionally one or more compounds (D), wherein compounds (A–E) are defined as:

(A) compounds containing at least two 1,2-epoxide groups, which are reaction products of:
  (A1) compounds having at least two 1,2-epoxide groups per molecule, selected from the group consisting of the diglycidyl ethers of bisphenol A and bisphenol F and polyoxyalkylene glycol diglycidyl ethers,
  (A2) optionally mono-epoxides, and
  (A3) one or more amines selected from:
    (A31) amines of the formula I $$\begin{array}{c} NH_2 \\ | \\ R^1-C-R^3 \\ | \\ R^2 \end{array} \quad (I)$$

in which
  $R^1$ is a branched or unbranched aliphatic, cycloaliphatic, araliphatic or aromatic hydrocarbon radical having 1 to 30 carbon atoms which is unsubstituted or substituted by hydroxyl, alkoxy or halogen groups,
  $R^2$ and $R^3$ independently of one another are each hydrogen or $R^1$ and, if $R^2$ and $R^3$ are hydrogen, $R^1$ is one of the following substituents

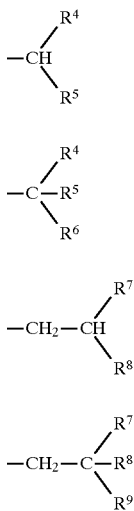

in which the radicals $R^4$ to $R^9$ independently of one another are each a branched or unbranched aliphatic, cycloaliphatic, araliphatic or aromatic hydrocarbon radical having 1 to 30 carbon atoms which is unsubstituted or substituted by hydroxyl, alkoxy or halogen groups, and $R^1$ and $R^2$ can form a substituted or unsubstituted cycloaliphatic ring having up to 8 carbon atoms, in which case $R^3$ is then a hydrogen atom, and (A 32) amines of the formula II

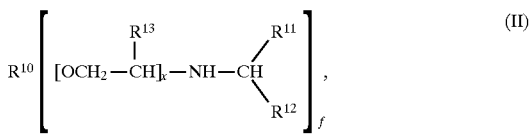

in which R¹⁰ is

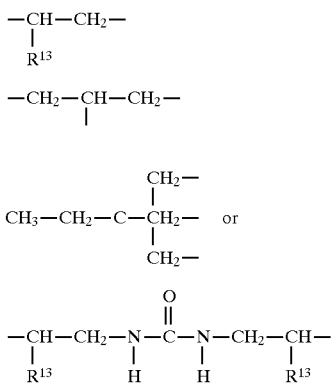

wherein
R¹¹ and R¹² independently of one another are each hydrogen, a saturated or unsaturated straight-chain, branched or cyclic (optionally substituted with heteroatoms in the ring) alkyl having up to 15 carbon atoms, or together are a cyclic alkylene radical having up to 8 carbon atoms which is unsubstituted or substituted up to three times by alkyl groups having 1 to 3 carbon atoms,
R¹³ is hydrogen or methyl,
x is an integer from 1 to 100, and
f is 2 or 3, and
(A 33) amines of the formula III

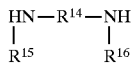 (III)

in which
R¹⁴ is an alkylene, cycloalkylene or aralkylene radical which is unsubstituted or substituted by hydroxyl, ether or halogen groups,
R¹⁵ and R¹⁶ are alkyl or, independently of one another, are a cycloalkyl or aralkyl radical which is unsubstituted or substituted by hydroxyl, ether or halogen groups, wherein radicals R¹⁵ and R¹⁶ are optionally connected, optionally via heteroatoms, with the proviso that at least one of the substituents R¹⁴, R¹⁵ or R¹⁶ in α- and/or β-position to each nitrogen atom is branched and/or that the nitrogen is attached as a ring atom;
(B) cyclocarbonates which are reaction products of the compounds (A) and (B1) carbon dioxide;
(C) cyclocarbonates which are reaction products of
(C1) compounds having at least two 1,2-epoxide groups per molecule, obtained from
(C11) compounds having at least two 1,2-epoxide groups per molecule, selected from the group consisting of the diglycidyl ethers of bisphenol A and bisphenol F and polyoxyalkylene glycol diglycidyl ethers
(C12) optionally with monoepoxides and
(C13) polyoxyalkyleneamines, and
(C2) carbon dioxide;
(D) 1,2-epoxide compounds which are not identical to (A1), (A2), (C11), (C12) and/or are unreacted portions of compounds (A1), (A2), (C11) and (C12) from the preparation of the compounds (A) and (C1); and (E) polyamines having at least two secondary amino groups wherein the ratio of epoxy groups to that of amine hydrogen atoms is from 1:2 to 1:10, and the ratio of cyclocarbonate groups to amine hydrogen atoms is from 1:3 to 1:10.

2. A hardener composition as claimed in claim 1, wherein the compounds (A1), (C11) and (D) have epoxide equivalent weights of from 100 to 500 g/mol.

3. A hardener composition as claimed in claim 2, wherein the compound (D) is selected from the group consisting of the diglycidyl ethers of bisphenol A and bisphenol F.

4. A hardener composition as claimed in claim 1, wherein the compounds (A1) are polyoxyalkylene glycol diglycidyl ethers.

5. A hardener composition as claimed in claim 4, wherein the compounds (A1) are polypropylene glycol diglycidyl ethers.

6. A hardener composition as claimed in claim 1, wherein the amines (A31) are tert-alkylamines having 4 to 22 carbon atoms.

7. A hardener composition as claimed in claim 1, wherein the amines (A31) have the formula IV

 (IV)

in which R¹⁸ and R¹⁹ are defined the same as R¹ or R¹⁸ and R¹⁹ can form a substituted or unsubstituted cycloaliphatic ring having up to 8 carbon atoms.

8. A hardener composition as claimed in claim 7, wherein the amine (A31) is 2-aminobutane.

9. A hardener composition as claimed in claim 7, wherein the amine (A31) is 2-ethylhexylamine.

10. A hardener composition as claimed in claim 1, wherein radicals R¹⁵ and R¹⁶ are

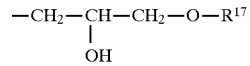

in which R¹⁷ is an alkyl, cycloalkyl, aralkyl or aryl radical which is unsubstituted or substituted by hydroxyl, ether or halogen groups.

11. A hardener composition as claimed in claim 1, wherein the compounds (A) are reaction products of polyoxypropylene glycol diglycidyl ethers (A1) and one or more of 2-aminobutane and 2-ethylhexylamine (A3).

12. A hardener composition as claimed in claim 1, wherein the compounds (B) are reaction products of polyoxypropylene glycol diglycidyl ethers (A1) and one or more of 2-aminobutane and 2-ethylhexylamine (A3) and carbon dioxide (B1).

13. A hardener composition as claimed in claim 1, wherein the polyoxyalkyleneamines (C13) are polyoxyalkylenemonoamines.

14. A hardener composition as claimed in claim 1, wherein the compounds (C) are reaction products of: compounds (C1) which are reaction products of compounds (C11) selected from the group consisting of the diglycidyl ethers of bisphenol A and F, and polyoxyalkylenemonoamines (C13) with molecular masses of from 130 to 5000 g/mol; and carbon dioxide (C2).

15. A hardener composition as claimed in claims 12, wherein from 10 to 95% of the epoxide groups are converted into cyclocarbonate groups.

16. A hardener composition as claimed in claim 14, wherein from 10 to 95% of the epoxide groups are converted into cyclocarbonate groups.

17. A hardener composition as claimed in claim 1, wherein the amines (E) are one or more of ethylenediamine, 2-methylpentanediamine, trimethylhexamethylenediamine, 2-aminoethylpiperazine or m-xylylenediamine.

18. A method for adhering two substrates, comprising applying an epoxy resin and the hardener composition of claim 1 to one or both of the substrates and bringing the substrates into a contacting relationship.

19. A method for coating a substrate, comprising applying a coating composition to a substrate, wherein the coating composition includes an epoxy resin and the hardener composition of claim 1.

20. An aqueous epoxy resin or epoxy resin dispersion, comprising a hardener composition as claimed in claim 1 and an epoxy resin.

21. A method for producing a hardener composition of claim 1, comprising reacting one or more compounds of (A), (B) and (C) with compound (E) and optionally compound of (D), wherein compounds (A–E) are defined as in claim 1.

* * * * *